(12) United States Patent
Qian et al.

(10) Patent No.: US 7,672,286 B2
(45) Date of Patent: Mar. 2, 2010

(54) REVERSE-LINK STRUCTURE FOR A MULTI-CARRIER COMMUNICATION SYSTEM

(75) Inventors: Feng Qian, Buffalo Grove, IL (US); Hong Kui Yang, San Diego, CA (US); Stanislaw Czaja, Cardiff, CA (US)

(73) Assignee: VIA Telecom Co., Ltd. (KY)

( * ) Notice: Subject to any disclaimer, the term of this patent is extended or adjusted under 35 U.S.C. 154(b) by 688 days.

(21) Appl. No.: 11/405,830

(22) Filed: Apr. 17, 2006

(65) Prior Publication Data

US 2006/0268883 A1  Nov. 30, 2006

Related U.S. Application Data

(60) Provisional application No. 60/672,917, filed on Apr. 18, 2005.

(51) Int. Cl.
*H04B 7/216* (2006.01)

(52) U.S. Cl. ............... 370/342; 370/208; 370/230; 370/231; 370/232; 370/233; 370/234; 370/235; 370/320; 370/335

(58) Field of Classification Search .......... 370/320, 370/335, 342, 208, 230–235
See application file for complete search history.

(56) References Cited

U.S. PATENT DOCUMENTS

| | | | |
|---|---|---|---|
| 6,169,768 B1 | 1/2001 | Okada et al. | |
| 6,930,992 B2 | 8/2005 | Qian et al. | |
| 6,987,802 B2 * | 1/2006 | Palm | 375/222 |
| 7,149,190 B1 * | 12/2006 | Li et al. | 370/278 |
| 7,359,365 B2 | 4/2008 | Qian et al. | |
| 2002/0061050 A1 * | 5/2002 | Ozluturk et al. | 375/141 |
| 2003/0031142 A1 * | 2/2003 | Jou | 370/320 |
| 2003/0058822 A1 * | 3/2003 | Jou | 370/335 |
| 2003/0086363 A1 | 5/2003 | Hernandez | |
| 2004/0137931 A1 * | 7/2004 | Sarkar et al. | 455/522 |
| 2004/0158790 A1 * | 8/2004 | Gaal et al. | 714/748 |
| 2004/0181569 A1 | 9/2004 | Attar et al. | |
| 2004/0192218 A1 | 9/2004 | Oprea | |
| 2005/0094604 A1 * | 5/2005 | Ozluturk et al. | 370/335 |
| 2005/0135312 A1 * | 6/2005 | Montojo et al. | 370/335 |
| 2006/0133522 A1 * | 6/2006 | Sutivong et al. | 375/260 |
| 2006/0229091 A1 * | 10/2006 | Rezaiifar et al. | 455/509 |

OTHER PUBLICATIONS

Qian, et al., "Power Efficient RL-ACK Signaling Scheme for NxEV-DO", 3GPP2, C-25-20050718-021, pp. 1-4, Jul. 18, 2005.

(Continued)

*Primary Examiner*—Rafael Pérez-Gutiérrez
*Assistant Examiner*—Liton Miah
(74) *Attorney, Agent, or Firm*—James W. Huffman; William Boling; Joel Stevens

(57) ABSTRACT

A method and system for providing acknowledgment and/or data rate control (DRC) information with respect to data packets conveyed on a plurality of active forward link (FL) carriers. The number of reverse link (RL) carriers employed for the acknowledgment and/or DRC information may be less than the number of active FL carriers, and may be a single carrier, even when the signaling protocol is, in the limit, consistent with presently-supported standardized CDMA protocols. Code multiplexing techniques are employed inventively to convey information for up to fifteen FL carriers on a single, standard CDMA channel designed to provide such signaling for only a single FL carrier at a time.

18 Claims, 2 Drawing Sheets

OTHER PUBLICATIONS

Qian, et al., "Analysis of Receiver Implementation for Nx-HRPD", 3GPP2, C25-20050516-007, pp. 1-6, May 16, 2005.

Qian, et al., "AN Receiver Implementation for HRPD RL ACK/DRC for MC-DO", 3GPP2, C30-20040114-VIA-001, pp. 1-5, Jan. 14, 2004.

Qian, et al., "DRC Channel for Multi-Carrier HRPD", 3GPP2, C30-20040518-017, pp. 1-3, May 18, 2004.

Qian, et al., "Processing of ACK and DRC for MC-HRPD", 3GPP2, C25-20050516-007, pp. 1-6, May 16, 2005.

Qian, et al., "DRC Channel for Multi-Carrier HRPD", 3GPP2, C25-20040518-028, pp. 1-3, May 18, 2004.

Qian, et al., "Reverse Link ACK for Multi-Carrier HRPD", 3GPP2, C25-20040518-027, pp. 1-3, May 18, 2004.

Qian, et al., Reverse Link ACK for Multi-Carrier HRPD, 3GPP2, C30-20040518-016, pp. 1-3, May 18, 2004.

Qian, et al., "HRPD Reverse-Link Structure Enhancement for MC-DO", 3GPP2, C30-20040114-VIA-001, pp. 1-5, Jan. 14, 2004.

Rashid Attar, "CDMA2000 Multi-Carrier HRPD Physical Layer", C25-20050314-044_QCOM_HRPD_PhysicalLayer.ppt., pp. 1-7, Mar. 14, 2005.

"CDMA2000 High Rate Packet Data Air Interface Specification", 3GPP2 C.S0024-A, Version 1.0, pp. 12-1 through 13-78 (Chapters 12 and 13), Mar. 2004.

3rd Generation Partnership Project; Technical Specification Group Radio Access Network; Physical layer procedures (FDD)(Rel. 5), 3GPP TS 25.214 V5.11.0, pp. 1-51, Jun. 2005.

Kamran, Afshar, photocopy of Notice of Allowance received from the USPTO dated Mar. 6, 2009 for related U.S. Appl. No. 11/488,909, 16 pages.

* cited by examiner

REVERSE-LINK STRUCTURE FOR A MULTI-CARRIER COMMUNICATION SYSTEM

CROSS REFERENCE TO RELATED APPLICATIONS—CLAIMS OF PRIORITY

This application claims priority to U.S. Provisional Application 60/672,917, filed Apr. 18, 2005, entitled "HRPD Reverse-Link Structure Enhancement for MC-DO," the entire contents of which are hereby incorporated herein by reference.

BACKGROUND

1. Field

This application generally relates to the field of wireless communication systems, and more particularly to signals and protocols that enhance data transmission efficiency in such systems.

2. Related Art

The subject matter set forth herein is applicable to wireless communication systems that multiplex signals using techniques of time division multiplexing (TDM), code division multiplexing (CDM), and frequency division multiplexing (FDM). However, it has been developed primarily in the context of CDMA (Code Division Multiple Access) cellular telecommunication systems that provide high-speed connectivity including data and voice transport on both point-to-point and point-to-multipoint bases. First-generation (analog) and second-generation (digital) cellular networks were used primarily for communicating voice traffic via mobile cellular telephones, and thus maintained a focus on access methods for the efficient transport of voice information. With the rising popularity of the Internet, a third-generation (3G) wideband multimedia cellular network continues to be developed to transport both voice and data at much higher speeds than were previously available using the first and second generation wireless networks.

A Third Generation Partnership Project 2 (3GPP2) has been established by industry groups for the purpose of defining specifications to transition current code-division multiple-access (CDMA) wireless networks to the third generation, which is commonly referred to as CDMA2000. One such specification may be referred to as "IS-856," also called (CDMA system) "EV-DO." Rev 0 and Rev A IS-856 specifications have been published and are available from the 3GPP2 organization as IS-856 and IS-856-A (also C.S0024-A, C.S0024-B), and are incorporated by reference herein in their entireties for teachings on communications protocols used in 3G wireless communications systems.

The 3GPP2 organization is primarily concerned with defining specifications for CDMA systems such as are implemented in North America. A document specifying a somewhat different CDMA system, such as is used more commonly in Europe, may be identified as 3GPP TSG-RAN Release-5, and is hereby incorporated by reference for its teachings on CDMA systems.

Cellular communications systems traditionally provided almost exclusively telephone voice connectivity, with data transfer only in support of the voice connection or as possible with audio-frequency modems. The systems are evolving toward an ability to convey high rate packet data "HRPD" between base stations ("BSs") or "Access Networks" ("ANs") to mobile stations ("MSs") or "Access Terminals" ("ATs").

European countries have previously employed GSM technology for telephone operation, which is based on time division multiplexing ("TDM"). As the European systems are modified to accommodate high rate packet data, CDMA is being adopted as a new technology. Being new, no provision need be made for MSs or BSs configured to operate in accordance with earlier generation or "legacy" CDMA standards. These countries are adopting a wideband version of CDMA, WCDMA, which employs a 5 MHz physical communication channel that is four times as large as the 1.25 MHz bandwidth of carriers in existing CDMA systems, such as are widely deployed in the United States.

In countries such as the United States that have a large installed base of CDMA systems, it will be useful to increase high speed data communication capacity while remaining compatible with legacy devices and architectures. This issue has been addressed in many papers submitted to the 3GGP2 organization, such as C30-20050314-044R1_QCOM_MultiCarrier_HRPD_PhysicalLayer.pdf.

Packet data communications typically rely on transmitting packets at the minimal power that is statistically likely to cause correct reception. The power of signals transmitted to other receivers appears as general "noise" to a particular receiver (e.g., an MS) to which the signals are not directed, reducing their ability to correctly receive their own signals. Thus, minimizing power is well understood to leave system capacity to serve more receivers, which is very desirable. Employing minimum power for a particular packet necessarily entails a statistical probability of transmitting unsuccessfully. Unsuccessfully transmitted packets must be retransmitted, or otherwise clarified, to ensure that the data is ultimately received correctly. Consequently, Automatic Retransmission reQuest (ARQ) techniques are employed that rely on reverse link acknowledgment signaling to enhance data transfer efficiency.

Higher rates of data transfer are made possible by various techniques, typically including increasing data density through more complex modulation schemes and more efficient (but less redundant) coding techniques. The techniques that increase data rate generally decrease the accuracy of reception. MSs that are receiving data are in the best position to determine whether the received signal is good enough to successfully support a higher data rate, or whether a lower data rate should be used to improve reception accuracy. MSs therefore are typically designed to provide Data Rate Control instructions to the serving station, in order to constantly adjust for the best tradeoff between speed and accuracy.

Unlike basic voice transmission requirements, packet data transmission is often asymmetric between a forward link (FL) and a reverse link (RL), as a data file, for example, is transferred on the FL direction without corresponding data transmission on the RL. Indeed, the designation as FL and RL may be taken to reflect a direction of primary data transfer, and need not refer to transmissions from a serving base station and from a terminal station, respectively. Typically, however, the FL direction is from an Access Network station to an Access Terminal station.

RL transmission of information strictly in support of FL data transfers, such as acknowledgment and DRC information, constitutes signaling "overhead." It is desirable to minimize the proportion of bandwidth and power that must be allocated for such overhead, while increasing the amount of FL data that is conveyed. Transmission protocols that are efficient for data communication, as opposed to voice communication, may be called "data only" or simply "DO."

Where legacy CDMA systems having preexisting channel carriers allocated (typically occupying spectrum with a bandwidth of 1.25 MHz or 5 MHz), it is desired to increase data transmission rates while retaining the preexisting channel carrier allocations. To do so, it is possible to transmit data concurrently through a plurality of different FL channel carriers (of, e.g., 1.25 MHz or 5 MHz each). Such plural-carrier transmissions are referred to as "multicarrier" transmissions for data only, or MC-DO. As data rates continue to increase, even WCDMA, which has a carrier bandwidth of 5 MHz, will benefit from multicarrier operation.

In order to maximize system capacity, there is a need to select an architecture and protocol that will permit asymmetric MC-DO transmissions to be as efficient as possible. Existing proposals do not gracefully enable a single RL feedback carrier to convey acknowledgment and DRC information for a multiplicity of FL carriers. The method and system set forth herein address the need for efficient and expandable operation at continuously increasing data rates, while retaining compatibility with legacy systems, and thus resolve the problems noted above.

SUMMARY

A method and related apparatus are disclosed for practicing efficient asymmetric data transmission. The method permits a single reverse link (RL) carrier to provide acknowledgment information and/or data rate control (DRC) information with respect to packets transmitted on a plurality of different forward link (FL) carrier spectra.

One aspect is a method of asymmetrically receiving data, whereby a receiver receives different data packets from a source via corresponding forward link channels that each occupy a corresponding carrier at a different frequency, and determining acknowledgment status for all of the packets. The method also includes transmitting the acknowledgment status from the receiver to the source over an acknowledgment channel on a single reverse link carrier, and multiplexing acknowledgment symbols reflecting the different data packets onto the reverse link acknowledgment channel after imposing a corresponding different multi-bit orthogonal code cover on the acknowledgment symbols Another aspect is a method of communicating data asymmetrically. The method of this aspect includes transmitting multiple data packets concurrently on different channels from a data source station to a data receiving station, receiving the data packets at the receiving station, and assigning binary acknowledgment status reflecting the success or failure of each packet. The method further includes the receiving station transmitting an indication of whether a majority of the packets were received correctly, and an indication as to each acknowledgment status, where the majority acknowledgment status is indicated by a DTX or absence of signal, irrespective of whether the majority status is positive or negative.

Yet another aspect is a method by which a data receiver receives data asymmetrically from a particular data source station. The method includes receiving data packets via a number of different FL carriers, and determining a data rate control (DRC) status for each of the different FL carriers. The method further includes transmitting the DRC status for each of the FL channels via an RL DRC channel on a single RL carrier. This is done consistently with a previous CDMA standard, insofar as each DRC status is reflected in a DRC code sequence based on a 4-bit DRC symbol with biorthogonal encoding and a 3-bit cover, the DRC channel carrier is the RL carrier that is usually "paired" to one of the FL carriers, and the RL DRC channel is spread using the usual length-16 Walsh code. The method includes covering symbol sequences reflecting DRC for each of the different FL carriers with an orthogonal code cover of length $K=2^n$, where K is not less than the number of FL carriers, and combining to form a DRC sequence to be spread using the usual length-16 Walsh code.

Yet a further aspect includes a system for asymmetrical data transmission. The system includes a data source station configured to concurrently transmit different data packets each in a corresponding different forward link (FL) data channel that modulates a corresponding different FL carrier having a corresponding different frequency spectrum. The system also includes a data receiving station that has a signal reception module to receive the packets transmitted on the plurality of different FL carriers, and a data analysis module to determine acknowledgment status for each of the packets and a data rate control (DRC) value for each of the FL data channels. The data receiving station also includes a DRC signal preparation module to establish a symbol sequence that includes the DRC value of each of the FL data channels encoded in a DRC code sequence based on a 4-bit DRC symbol with biorthogonal encoding and a 3-bit cover, and to cover the DRC code sequence for each FL channel with an orthogonal code cover having a length $K=2^n$, n the smallest integer such that K>=the number of FL channels. The data receiving station also includes a signal transmission module to transmit the determined acknowledgment status for the packets and the DRC symbol sequence for the plurality of FL data channels by modulating a single reverse link (RL) carrier having a single frequency spectrum.

DETAILED DESCRIPTION

Terminology

A carrier, or carrier spectrum, is a frequency range of electromagnetic spectrum. In CDMA communications, a carrier may be modulated to convey a multitude of channels distinguished by different codes. As used herein, carriers are assumed to have a fixed bandwidth, though in principle they could be variable. Carriers may, for example, have a bandwidth of 1.25 MHz as is specified by presently-supported standards for CDMA communications in the United States, or a 5 MHz bandwidth as specified for WCDMA systems.

Asymmetric communication has two distinct meanings. In many communication systems, especially point-to-multipoint systems, a great deal more data is expected to be communicated from a base station point to the numerous remote stations (multipoints) that it serves. Thus, special protocols and carrier assignments may be made to accommodate such serving station/served station asymmetry. However, between any two stations that are in communication, there may be a data transfer asymmetry that varies from time to time depending on the current direction of primary data transfer. This is different from ordinary full-duplex telephone voice operation, in which that data each direction is more nearly equal. As between a serving base station sector and a served station, either station may be the primary source of data over a particular period of time.

In the description herein, therefore, the serving station (also called base station "BS" or access network "AN") is not assumed to necessarily be the data source station, nor is a served station (e.g., a mobile station "MS," user equipment "UE," or access terminal "AT") assumed to necessarily be the data receiving station. However, due to the overall asymmetry in serving vs. served station data transmissions, a serving station will typically be the data source station for asymmetric data transmission. In view of the overall asymmetry, the methods described herein to facilitate asymmetric data communication need not be implemented similarly in BSs and MSs. Some embodiments of aspects of the method described herein may be reserved for the typical circumstance when the data source is a BS, while in other embodiments the method may be reserved for the less typical circumstance in which the data source station is an MS. Implementations for these two alternatives will generally differ, at least due to differences between BS and MS protocols as defined in the CDMA standards that are presently supported.

To maintain generality, then, forward link (FL) transmissions may refer to those from a data source station to a data receiving station, even though FL typically refers to transmissions from a BS to an MS. Similarly, reverse link (RL) may refer to any communication from a station that is presently primarily receiving data from another, and is not restricted to communication from an MS to a BS.

Asymmetric Multi-Carrier Data Communication

Figure 1:
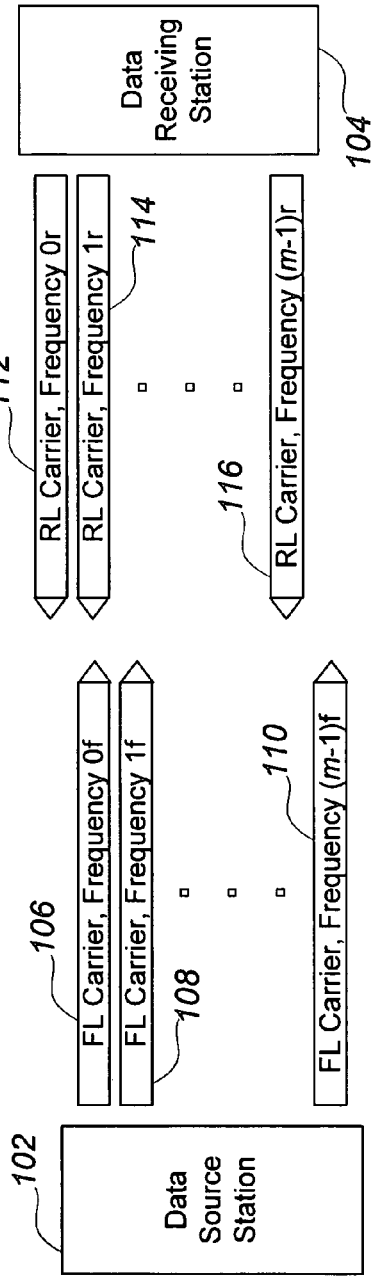
FIG. 1 represents relationships between uplink and downlink carrier spectra in a system for asymmetric data communication.

As represented in FIG. 1, a data source station 102 may transmit signals to a data receiving station 104 over one or more of m available forward link (FL) carriers 0f, 1f, . . . (m−1)f (as represented by bands 106, 108 and 110, respectively). Reverse link (RL) carriers 0r, 1r, . . . (m−1)r (as represented by bands 112, 114 and 116, respectively) are shown corresponding to each FL carrier for generality. The correspondence between FL and RL carriers is typically established as a convention of the applicable system definition. Corresponding FL and RL carrier pairs in CDMA systems deployed in the United States are typically offset by a predetermined offset frequency. However, any predetermined pairing may be used to the same effect.

In accordance with CDMA standards as presently supported, a single FL carrier is selected for data transmission from a data source station to a data receiving station. At least two items of feedback information are transmitted on the corresponding RL carrier from the receiving station to the data source station: acknowledgment information with respect to each data packet already received by the receiving station, and data rate control (DRC) information. The DRC information is feedback, in that it reflects the success of previous data rates, but also establishes a future data rate so that the receiving station can readily decode subsequent data.

To increase the rate at which data can be transferred, it will be useful to transmit data on a multiplicity of FL carriers. One goal is to support data transmission from a data source station to a data receiving station concurrently on up to fifteen FL carriers. Data transmission from a single data source station to a particular receiving station, concurrently on a plurality of different FL carriers, will be generally referred to as "multi-carrier" data transmission.

Data packets transmitted on one carrier are, of course, entirely separate from those transmitted on another. As such, efficient data communication protocols require the receiving station to return acknowledgment and DRC information, as noted above, with respect to each carrier on which a data packet is transmitted. There are advantages to conveying all such feedback information on a single RL carrier. For example, it can avoid a need for a receiving station to transmit concurrently on a plurality of frequencies, which reduces the hardware requirements for such stations.

The first FL carrier selected for data transmission immediately implicates the corresponding RL carrier for feedback information, in accordance with standardized protocols. For consistency with single-carrier data transmission, multi-carrier data transmission may require feedback information to be transmitted on the RL carrier corresponding to a first-selected FL carrier. Different assignments for the RL feedback carrier, however, are acceptable if they are established by convention. It will be useful if the RL carrier is sufficient to convey all of the feedback information for all of the FL carriers that concurrently transmit data packets. Moreover, in the interest of backward compatibility, it will be helpful if the acknowledgment and DRC information is conveyed via the same CDMA channels as are specified by currently-supported CDMA standards. Using the same CDMA channels may avoid a need to modify hardware in the large number of CDMA BSs that are already deployed.

FIG. 1 represents a system for multicarrier FL data transmission with single carrier RL transmission of acknowledgment and/or data rate control (DRC) information, under the following conditions. A plurality of the forward link carriers from the data source station 102, 0f . . . (m−1)f (represented by arrows 106, 108 and 110, respectively), concurrently transmit packets to the data receiving station 104. After receiving the packets, the data receiving station 104 determines acknowledgment status for each packet, and/or determines data rate control (DRC) information with respect to each channel conveying a data packet. The data receiving station 104 creates one or more messages containing such acknowledgment and/ or DRC information, and transmits such information to the data source station 102 by modulating only a single RL carrier, such as the RL Carrier, Frequency 0r (112). Any of the techniques of signaling transmission and reception that are described herein may be employed by such a system, such that each different signaling technique thereby establishes another embodiment of the multicarrier FL data transmission with single carrier RL transmission of acknowledgment and/ or DRC information.

Both the data source station 102 and the data receiving station 104 may include various modules to effect their respective operations. Indeed, it is fair to consider that these devices include a module to perform each and every task. Modules are functional in nature, and may include parts in different assemblies, and/or may include software for execution on a processor (typically a special purpose data processor). Therefore, if a step in a method is described herein for a data source station or a data receiving station, it may certainly be said that the respective station includes a module configured to perform such step. Because the modules may be implemented in a wide variety of different ways, construction of the stations becomes extremely flexible with such a modular approach.

Multicarrier Acknowledgment Signaling

Figure 2:
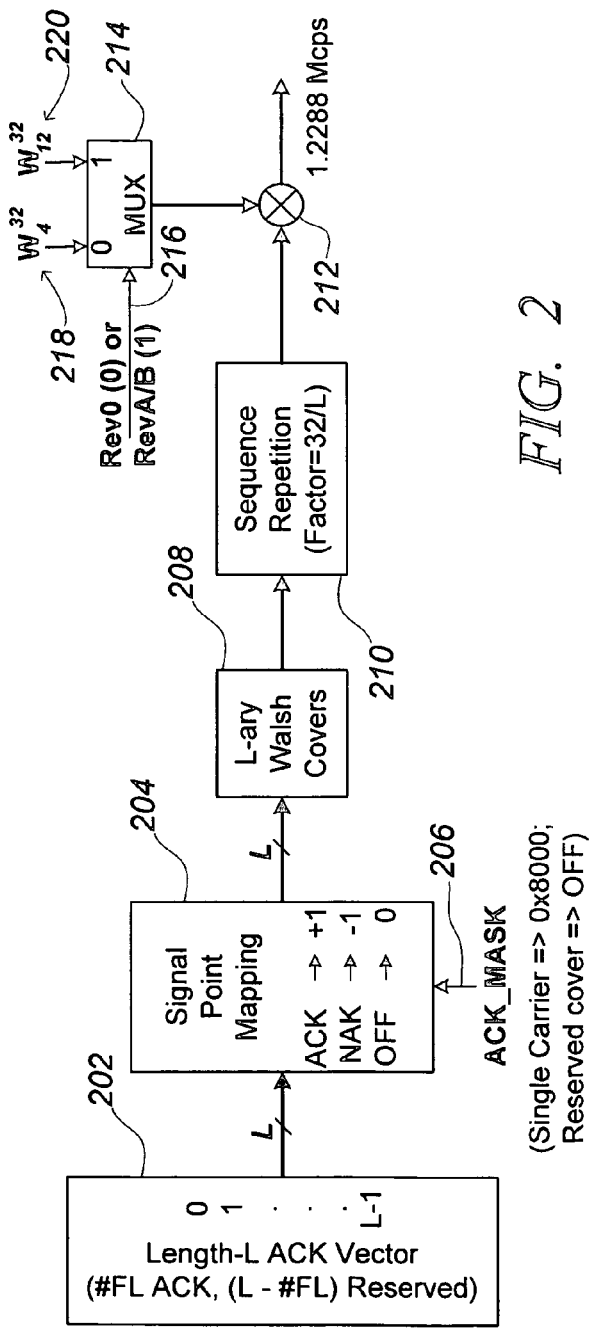
FIG. 2 is a block diagram of processing steps for exemplary acknowledgment channel processing for asymmetric multi-carrier data communication.

FIG. 2 illustrates a signal processing block diagram for providing multicarrier acknowledgment feedback on a selected CDMA channel. FIG. 2 illustrates acknowledgment processing for a variable number of up to L different FL carriers. L has a value of $2^n$, n a positive integer 0<n, but in most circumstances L<=16. The number of FL carriers supported is indicated as #FL. #FL <=L.

Block 202 provides information, typically binary, reflecting the packet acknowledgment status for each of the #FL supported FL carriers. Determining the nature and value of the data may be done in any conventional way, whether old, or as may be implemented in the future. Such determination is well understood, and is beyond the scope of this disclosure. In one embodiment, acknowledgment of up to fifteen FL carriers is supported (#FL=15). In that case, the extra data bit (L−#FL) may be reserved, and is discussed below. One or more extra or reserved bits are available whenever the number of supported FL carriers is not $2^n$. If the number of supported FL carriers is 2 or 4, however, it will be more efficient not to reserve any bits, but to provide data only for such 2 or 4 supported FL carriers.

Block 202 thus concurrently provides L bits, including at least one bit for each supported FL carriers, i.e., 2, 4, 8 or 16 bits. The bits are typically logical binary representations, and are provided to a signal point mapping block 204. ACK (positive acknowledgment of a particular packet as having been received correctly) may, for example, be indicated by a logical zero, while NAK (negative acknowledgment that a particular packet was not received correctly) may be indicated by a logical one. These incoming binary bits may be translated by the block 204 to +1 and −1, respectively. Any present or later-adopted conventional signal mapping assignment will be satisfactory.

Incoming logical binary data is recognized, by definition, as either logical one or zero, and thus the signal point mapping block 204 will recognize L values (the number of supported FL carriers #FL plus reserved bits). However, all supported FL carriers may not presently have an actively transmitted packet for which acknowledgment is required. One way to accommodate such a variable number of active FL carriers is to provide an ACK_MASK as an input 206 to the signal point mapping block 204. For those supported FL carriers that are not presently active, the ACK_MASK may force the block 204 to output a zero rather than a +1 or a −1 symbol (binary phase shift keyed "BPSK" symbols). For example, when only a single FL carrier has transmitted a packet, ACK_MASK may assert a value of 0×8000, such that only the bit corresponding to FL carrier $0f$ is mapped to an active signal value of +1 or −1, while all others are mapped to no signal (0).

As illustrated, the ACK_MASK also disables the reserved bit. However, the reserved bit may be enabled at different times or for different signaling protocols, as discussed below.

The block 204 thus may concurrently provide up to L active signal symbols to a Walsh cover block 208. Block 208 performs a length-L Walsh transform on the incoming symbols, spreading the up-to L symbols into a length-L sequence. This process effectively Walsh covers each active signal, and then combines the covered signals into a combined length-L sequence. It may be useful to assign Walsh 0 to the bit that acknowledges packets on the FL carrier frequency $0f$ that corresponds to the RL carrier frequency $0r$ employed for the ACK channel. In other words, Walsh 0 should be applied to the FL carrier that is normally paired to the RL carrier being used for feedback. Thereby, when only a single FL carrier is active, the system may conform to a previous CDMA standard. For convenience, additional FL carriers for which packet acknowledgment is needed may be implicitly assigned to other Walsh codes based on their relative index to the FL carrier that corresponds to the RL carrier. The Walsh codes need not be assigned in numeric order, and indeed may be better assigned in accordance with development via the Walsh tree. Thereby, when fewer concurrent FL packets are supported (or require acknowledgment), Walsh codes involving fewer adjacent state changes may be applied to simplify hardware processing in some instances.

Presuming that L<32, the sequence produced by the Walsh cover block 208 is repeated at a block 210 by a factor of 32/L. However, the overall sequence length may vary in other embodiments. Many embodiments will maintain a time duration for the resulting (i.e., after any repetition) acknowledgment symbol sequence that is the same as is used for supported versions of a CDMA system. By maintaining the same physical duration, the number of symbols may be varied while permitting the sequence to occupy the transmission time interval (TTI) specified by a previous CDMA standard, such as one half standard slot. The actual number of symbols may be varied by varying the symbol rate.

It should be noted that the processing indicated in FIG. 2 illustrates concepts to be effected, and actual implementation may take many forms. The block 210, for example, may be implemented by a command to the block 208 to generate the Walsh covered sequence twice from a given set of symbols provided from the block 204. A gain stage, not shown, may be provided after the block 204. The location of the gain stage may affect the implementation of subsequent processing blocks, as will be readily understood by those of skill in the art.

The symbol sequence from the block 210 enters a modulation stage 212, where it is modulated onto a Walsh channel. The Walsh channel may be selected by a MUX 214 from among Walsh channels that are employed for acknowledgment information in presently-supported versions of CDMA standards. In particular, for example, if an input 216 indicates (e.g., with a zero) that the data source station is configured in accordance with Rev 0 of IS-856 (TIA/EIA IS-856), then a first Walsh code 218 will be applied to modulate the sequence (e.g., length-32 Walsh code number 4). Otherwise, input 216 will indicate (by value "1") that the data source station is configured in accordance with IS-856-A or subsequent IS-856-B (TIA/EIA IS-856-A, TIA/EIA IS-856-B). In that event, a different Walsh code 220 will be applied (e.g., length-32 Walsh code number 12). The indicated processing will result in a 32 symbol sequence which will occupy one half of an ordinary data slot, modulated by the appropriate Walsh code (e.g., at 1.2288 Mcps). Thus, it is consistent in this regard with the Walsh channel and timing configuration specified in currently-supported CDMA standards for data acknowledgment signaling. TIA/EIA IS-856, IS-856-A and so much of IS-856-B as has been published are all hereby incorporated in their entireties by reference for their teaching in regard to high speed packet data CDMA devices and procedures.

Many alternative implementations of Multicarrier Acknowledgement Signaling are consistent with the foregoing. Certain general techniques for such implementations may provide benefit. For example, sensitivity to burst fading may be reduced by configuring the signal processing such that, when possible, redundancy is achieved by repeating sequences rather than by repeating bits.

Reserved Bit(s) and Majority Channel Signaling

As noted above, when #FL (the number of FL carriers for which concurrent acknowledgment is supported) is less than L (where L>=#FL, L=$2^n$), at least one reserved bit is available. Such a bit may be used for any one of a number of purposes. A single bit may, for example, be used as a parity bit for all of the acknowledgment bits. Other uses are set forth below.

As the number of active FL carriers for which acknowledgment is required increases, the transmit power for the RL acknowledgment channel will generally also increase. Therefore, an extra bit may be used to reduce the transmit power. For example, a single bit may indicate that signaling is being modified from BPSK to On/Off to reduce power. As an example of On/Off signaling, NAK may be encoded as "Off." The data source station will ignore those particular FLs on which packets were not sent, or otherwise do not require acknowledgment.

One variation of On/Off signaling employs a reserved bit as a "majority channel index" to indicate whether the majority of acknowledgment signals is ACK or NAK. This variation saves power, particularly in the worst-case situation in which packets must be concurrently acknowledged on a relatively large number of FLs, such as 15.

Majority Channel Index On/Off signaling may be implemented as follows. Majority ACK: If a majority of the supported channels (those for which acknowledgment is appropriate) receive good packets, then the Majority Channel Index is transmitted as a +1 symbol. In this event, no active symbol ACKs are transmitted, but rather the symbols are DTXed (zero, or no symbol, is transmitted). An active symbol −1 is sent for each of the minority of carriers for which packets were received incorrectly. Majority NAK: If, however, the majority of carriers receive bad packets, then the Majority Channel Index is DTXed, as are all individual NAK symbols. In this case, an active symbol +1 is sent for each carrier/packet that was received correctly (ACK). As with other On/Off signaling, carriers not sending packets, or for which acknowledgment is otherwise unnecessary, are masked off and DTXed. There is no ambiguity because the data source station has sufficient information as to which signals are thus gated off.

Majority Channel Index On/Off signaling, as compared to simple On/Off signaling, can reduce maximum transmit power on the acknowledgment channel (ACK channel) by almost 50%, as illustrated in the table below with a few examples. Note that the savings of this signaling protocol do not rely on signaling acknowledgment on a single RL channel, or a particular coding or transmission scheme.

The power required for transmit in the single-carrier case is represented as P. In one row, a variable integer "A" represents the number of packets that are received correctly (ACKs).

Joint Maximum Likelihood Analysis

Joint Maximum Likelihood techniques will increase the robustness of the acknowledgment signaling. As with Majority Channel Indexing, this gain is largely independent of transmission implementation.

A Joint Maximum Likelihood decision algorithm will help ensure reliable detection performance for the acknowledgment signaling described above, as well as for many other signaling methods. For ACK channel signaling schemes that map the ACK signal for each channel (or carrier) on an orthogonal basis over the time interval of interest, the noises for each ACK sub-channel are all i.i.d. under AWGN.

Let $x(t) = \sum_{i=0}^{K} \mu_i w_i(t) + n(t)$.

After de-spreading with individual normalized orthogonal (orthonormal) cover $w_i(t)$, $x_i = \mu_i + n_i$, ($0 <= i >= K$). Here $n_i$ are uncorrelated because $w_i(t)$ have an orthonormal basis. The joint maximum likelihood decision is therefore selected among all the legal ACK/NAK/OFF combinations. Based on the definition above, there are two groups of legal combinations:

Majority Feedback=ACK: Others are either OFF or NAK each decidable individually by comparing b/w likelihood of ACK and OFF.

Majority Feedback-NAK: Others are either OFF or ACK NAK each decidable individually by comparing b/w likelihood of NAK and OFF.

Recall that $$LL = \prod_{i=0}^{K} \frac{e^{-\frac{(x_i-\mu_i)^2}{2\sigma^2}}}{\sqrt{2\pi}\,\sigma},$$

where $\mu_i = -1, 0, 1$, $i = 0, \ldots, K$. Consequently:

$$LL(1) = \frac{e^{-\frac{(x_0-1)^2}{2\sigma^2}}}{\sqrt{2\pi}\,\sigma} \prod_{i=1}^{K} \frac{e^{-\frac{(x_i-\mu_i)^2}{2\sigma^2}}}{\sqrt{2\pi}\,\sigma} = \frac{e^{-\frac{(x_0-1)^2}{2\sigma^2}}}{\sqrt{2\pi}\,\sigma} \prod_{i=1}^{K} \frac{e^{-\frac{\min((x_i)^2, (x_i+1)^2)}{2\sigma^2}}}{\sqrt{2\pi}\,\sigma},$$

where $$LL(0) = \frac{e^{-\frac{(x_0)^2}{2\sigma^2}}}{\sqrt{2\pi}\,\sigma} \prod_{i=1}^{K} \frac{e^{-\frac{(x_i-\mu_i)^2}{2\sigma^2}}}{\sqrt{2\pi}\,\sigma} = \frac{e^{-\frac{(x_0)^2}{2\sigma^2}}}{\sqrt{2\pi}\,\sigma} \prod_{i=1}^{K} \frac{e^{-\frac{\min((x_i)^2, (x_i-1)^2)}{2\sigma^2}}}{\sqrt{2\pi}\,\sigma},$$

| # of FLs to acknowledge | # of ACKs ("A") | # of NAKs | # of unused Channels | Power w/o Majority Channel | Majority Channel Signaling | Power w/ Majority Channel |
|---|---|---|---|---|---|---|
| 14 | 12 | 2 | 1 | 12P | 1 | P + 2P |
| 15 | 8 < A < 16 | 15 − A | 0 | AP | 1 | (16 − A)P < AP |
| 15 | 8 | 7 | 0 | 8P | 1 | P + 7P |
| 15 | 7 | 8 | 0 | 7P | 0 | 7P |
| 7 | 4 | 3 | 0 | 4P | 1 | P + 3P |
| 3 | 0 | 3 | 0 | 0P | 0 | 0P |
| 3 | 1 | 2 | 0 | P | 0 | P |
| 3 | 2 | 1 | 0 | 2P | 1 | P + P |
| 3 | 3 | 0 | 0 | 3P | 1 | P | where $$\mu_0 = 0 \cdot \mu_i = \frac{\text{argmin}((x_i - \mu_i)^2), i = 1, \ldots, K}{\mu_i = 0, 1}.$$

Multicarrier DRC Signaling

To maintain consistency with the coding of the DRC (data rate control) signal in accordance with standards that remain supported, extension to multicarrier operation may best be effected by establishing a combined DRC symbol sequence that has a duration depending upon the number of FL carriers for which DRC is needed. The number of FL carriers for which DRC is needed may be referred to as the number of rate controlled channels, and indicated as "#RCC."

Figure 3:
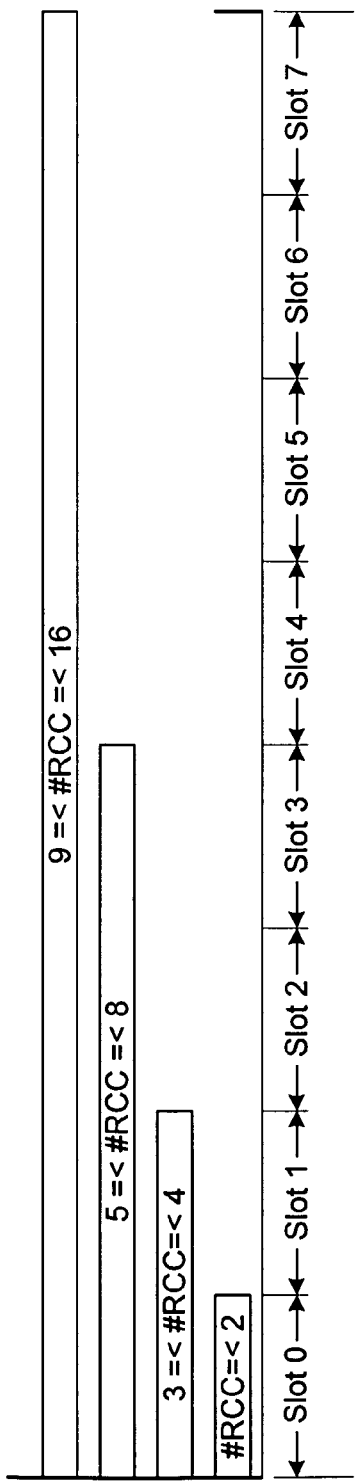
FIG. 3 illustrates the length, in slots, of extended DRC packets.

Let K be the smallest number such that $K=2^n$, and $K >= \#RCC$. Then the number of standard data slots required to convey a multicarrier DRC sequence, as described below in more detail, is K/2 standard slots. FIG. 3 illustrates the relationship between the DRC sequence length and a standard slot duration. The length of the bars, in slots, is the duration of the DRC frame. As may be seen, if 1 or 2 FL carriers require DRC, then the sequence length need only be the length of one standard slot (slot 0). As the number of FL carriers for which DRC is provided increases to 3 or 4, two slots are required, and so on until 8 slots are required to accommodate the DRC frame that indicates DRC information for up to 15 or even 16 FL carriers.

Figure 4:
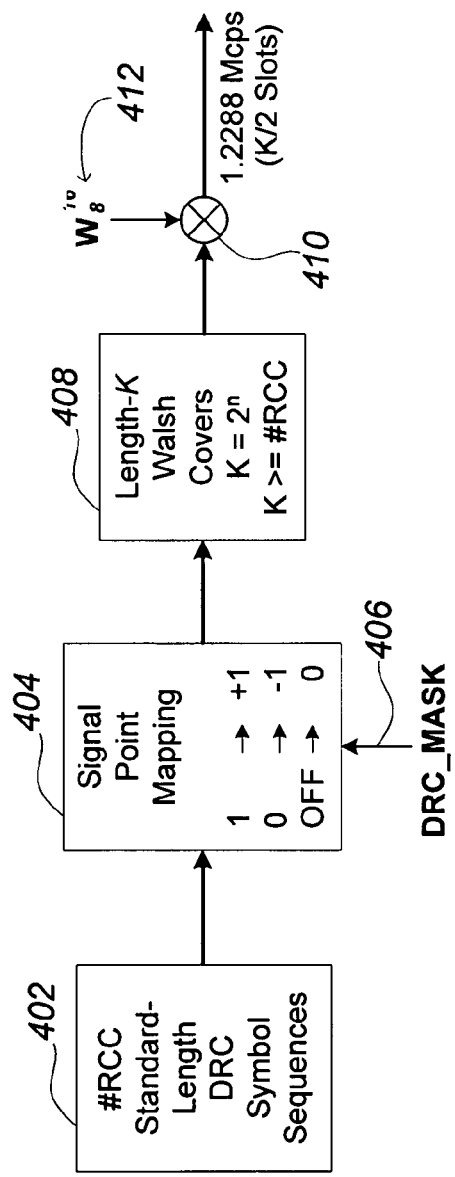
FIG. 4 is a block diagram of processing steps for exemplary DRC channel processing for asymmetric multi-carrier data communication.

The DRC frame may be developed as shown in FIG. 4. A block 402 represents the development of as many binary DRC sequences as are needed (#RCC) for the supported FL carriers. As defined in currently-supported CDMA standards, the DRC for a particular carrier is indicated by a 4-bit bi-orthogonally encoded symbol, which is covered with a 3-bit Walsh cover to generate a length-64 binary sequence. The block 402 is configured to provide DRC for the maximum number of FL carriers supported for concurrent data transmission.

A signal point mapping block 404 accepts the binary output from the block 402, and maps the binary data to BPSK +1, −1 signal symbols. Because the maximum number of supported FL carriers will not always require a DRC indication, a DRC_MASK is provided at an input 406 of the block 404 for ensuring that inactive DRC sequences are converted to DTX or zero symbols. Thus, #RCC sequences are forwarded to a Walsh cover block 408. A value K is selected as the smallest value for which $K=2^n$ and $K >= \#RCC$. Length-K Walsh covering of each symbol of the incoming sequences converts the #RCC incoming length-64 sequences to a single length 64K sequence. The resulting length 64K sequence is modulated by a modulator 410 with the Walsh code 412 at the chip rate (e.g., 1.2288 Mcps). As indicated above, the final sequence may extend over up to 8 standard slots, depending upon the #RCC of FL carriers for which DRC is being provided.

CONCLUSION

The foregoing description illustrates exemplary implementations, and novel features, of a method and system for asymmetrically transmitting data, using a plurality of FL carriers and using a single RL carrier to provide acknowledgment information and/or DRC information for all of the FL carriers. Although various alternative implementations are suggested, it is impractical to list all such alternatives. As such, the scope of the presented invention should be determined only by reference to the appended claims, and should not be limited by features illustrated in the foregoing description except insofar as such limitation is recited in an appended claim. The skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Thus, many more element combinations are contemplated as embodiments of the invention than can reasonably be enumerated explicitly herein. The scope of the invention may properly be defined only by the appended claims, rather than by the foregoing description. Moreover, however, the claims are themselves limited in number. As such, it is anticipated that further element combinations may be defined at a later time in accordance with continuation and divisional practice. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method of asymmetrically receiving data from a particular data source station at a data receiver, comprising:
    a) concurrently receiving a plurality of different data packets transmitted concurrently from the source via a corresponding plurality of different forward link channels that each modulate a different carrier frequency spectrum;
    b) determining acknowledgment status for each data packet as ACK if it was received correctly, or as NAK if it was received incorrectly;
    c) multiplexing acknowledgment symbols reflecting the different data packets onto a reverse link (RL) acknowledgment channel after imposing a corresponding different multi-bit orthogonal code cover on the acknowledgment symbols, wherein the multi-bit orthogonal code covering results in a sequence having a same duration, occupying a same transmit time interval (TTI), and being subsequently modulated by a same Walsh code as standardized for a previous version of a CDMA communication system; and
    d) transmitting the RL acknowledgment channel to the data source station by modulating a single carrier frequency spectrum.

2. The method of claim 1, wherein step (d) further comprises conforming to protocols standardized for a previous version of a CDMA communication system in that
    i) the acknowledgment status of each of the data packets is mapped to a signal to form the basis of an acknowledgment symbol pattern,
    ii) the reverse link acknowledgment channel carrier frequency has a same relationship to a first one of the forward link channels as in the previous version, and
    iii) the reverse link acknowledgment channel is spread using a same orthogonal code and occupies a same transmit time interval (TTI) as in the previous version.

3. The method of claim 1, wherein the multi-bit orthogonal code cover is a length-16 Walsh code cover, and the sequence after repetition has a length of 32 symbols.

4. The method of claim 3, wherein an order of the steps includes performing the length-16 Walsh code covering of the acknowledgment symbols derived from the acknowledgment status of each of the different packets and combining into a single length-16 sequence, then repeating the sequence, and then modulating with the same orthogonal code in step (d)(iii).

5. The method of claim 4, further comprising gating off length-16 Walsh covering corresponding to data packets on channels that did not receive a data packet.

6. The method of claim 1, wherein the multi-bit orthogonal code cover distinguishably combines acknowledgment status for data packets received on a multiplicity of different carriers, and also encodes an auxiliary bit for related purposes.

7. The method of claim 6, wherein the auxiliary bit indicates which of a plurality of signal mapping protocols has been applied to generate symbols reflecting acknowledgment status of the different data packets.

8. The method of claim 7, wherein the signal mapping protocols include indicating whether a majority of the data packets were received correctly or incorrectly, and discontinuing transmission for symbols reflecting such majority status for particular data packets, and employing an active symbol to reflect minority status for other particular data packets.

9. The method of claim 1, further comprising selecting the multi-bit orthogonal code for each forward link carrier acknowledgment on a Walsh tree basis such that as the number of forward link carrier data packets to be acknowledged increases, changes between adjacent values of the associated Walsh code cover sequence also increase.

10. The method of claim 1, further comprising selecting between using Walsh code $W_4^{32}$ and $W_{12}^{32}$ for the length-32 code of step (c)(iii) depending upon which version of CDMA standard the source station is configured to support.

11. The method of claim 3, wherein the symbol mapping of acknowledgment status of step (c)(i) further includes employing on/off signaling.

12. A method of communicating data asymmetrically between a data source station and a data receiving station, comprising:
   a) transmitting a multiplicity of data packets concurrently on a plurality of different channels from the data source station to the data receiving station;
   b) receiving the data packets at the receiving station and assigning binary acknowledgment status reflecting reception success or failure of each packet; and
   c) transmitting, from the receiving station to the data source station, indications
      i) as to whether a majority of the multiplicity of data packets were received correctly; and
      ii) reflecting the acknowledgment status of each particular one of the multiplicity of data packets;
   d) using a joint maximum likelihood algorithm to analyze, at the data source station, the acknowledgment status indicated by the transmission from the data receiving station;
   wherein majority acknowledgment status is indicated by an absence of signal irrespective of whether the majority status is positive or negative acknowledgment.

13. A method of asymmetrically receiving data from a particular data source station at a data receiver, comprising:
   a) receiving data packets transmitted from the source via a number of different forward link channels that each modulate a corresponding different carrier frequency spectrum;
   b) determining a Data Rate Control (DRC) value for each of the different forward link channels;
   c) transmitting the DRC value for each of the forward link channels via a reverse link DRC channel modulating a single carrier frequency spectrum, consistently with protocols standardized for a previous version of a CDMA communication system insofar as:
      i) the DRC value of each of the forward link channels is reflected in a DRC code sequence based on a 4-bit DRC symbol with biorthogonal encoding and a 3-bit cover,
      ii) the reverse link DRC channel carrier frequency has a same relationship to a first one of the forward link channels as in the previous version, and
      iii) the reverse link DRC channel is spread using a same length-16 Walsh code as in the previous version; and
   d) covering symbol sequences reflecting the DRC value for each of the different forward link carriers with an orthogonal code cover having a length $K=2^n$, n the smallest integer such that $K>=$ the number of forward link channels, and combining to form a DRC sequence for spreading as required by step (c)(iii).

14. The method of claim 13, wherein the DRC sequence has a length less than or equal to a length of a standard slot.

15. The method of claim 13, wherein the DRC sequence has a length equal to two or more standard slots.

16. The method of claim 13, further comprising:
   e) determining acknowledgment status for each data packet as ACK if it was received correctly, or as NAK if it was received incorrectly; and
   f) multiplexing acknowledgment symbols reflecting the different data packets onto the reverse link acknowledgment channel after imposing a corresponding different multi-bit orthogonal code cover on the acknowledgment symbols.

17. The method of claim 13, further comprising gating off the DRC symbol sequence corresponding to each forward link channel for which DRC is unnecessary.

18. A system configured to transmit data asymmetrically, comprising:
   a) a data source station configured to concurrently transmit each of a plurality of different data packets in a corresponding different forward link (FL) data channel that modulates a corresponding different FL carrier having a corresponding different frequency spectrum; and
   b) a data receiving station including
      i) a signal reception module configured to receive the packets transmitted on the plurality of different FL carriers,
      ii) a data analysis module configured to determine acknowledgment status for each of the packets and a data rate control (DRC) value for each of the FL data channels,
      iii) a DRC signal preparation module configured to establish a symbol sequence that includes the DRC value of each of the FL data channels encoded in a DRC code sequence based on a 4-bit DRC symbol with biorthogonal encoding and a 3-bit cover, and to cover the DRC code sequence for each FL channel with an orthogonal code cover having a length $K=2^n$, n the smallest integer such that $K>=$ the number of FL channels, and iv) a signal transmission module configured to transmit the determined acknowledgment status for the packets and the DRC symbol sequence for the plurality of FL data channels by modulating a single reverse link (RL) carrier having a single frequency spectrum.

* * * * *